United States Patent [19]

Stevens

[11] Patent Number: 4,608,033
[45] Date of Patent: Aug. 26, 1986

[54] BELT SPEED VARIATOR

[75] Inventor: Georges Stevens, Billere, France

[73] Assignee: Girard Transmissions, France

[21] Appl. No.: 657,692

[22] Filed: Oct. 4, 1984

[30] Foreign Application Priority Data

Oct. 6, 1983 [FR] France .................. 83 15894

[51] Int. Cl.⁴ .................. F16H 55/52; F16H 55/56
[52] U.S. Cl. .................................................. 474/39
[58] Field of Search ................ 474/37, 39, 43, 44, 474/45

[56] References Cited

U.S. PATENT DOCUMENTS

| | | | |
|---|---|---|---|
| 1,180,867 | 4/1916 | Milne | 474/39 X |
| 2,387,609 | 10/1945 | Reeves | 474/39 |
| 2,622,230 | 12/1952 | Mason | 474/39 X |
| 2,707,883 | 5/1955 | Dodge | 474/39 X |
| 3,802,285 | 4/1974 | Williams | 474/44 |
| 3,811,331 | 5/1974 | Moogk | 474/39 X |

Primary Examiner—Donald Watkins
Attorney, Agent, or Firm—William A. Drucker

[57] ABSTRACT

A belt speed variator is provided in which the mobile flange of the drive pulley bears radially and axially by its outer face on a bearing which itself bears on an adjusting ring screwed into the centering ring integral with said casing. The axial bore of the mobile flange is slightly greater than the diameter of the drive ring forming the hub of the drive pulley so that a slight clearance is provided between said drive ring and said mobile flange while preventing the formation of contact rust.

3 Claims, 2 Drawing Figures

BELT SPEED VARIATOR

BACKGROUND OF THE INVENTION

The present invention relates to belt speed variators.

Generally, these apparatus comprise a drive pulley (connected to the drive shaft) and a driven pulley (connected to the driven shaft) over which passes a transmission belt, generally trapezoidal. These pulleys are designed so as to have a fixed flange and an axially mobile flange so that, during variation of the speed of the motor, the spacing between the flanges of the two pulleys varies in conjugate fashion so as to maintain constant the tension of the belt, while modifying the drive radius of the pulleys. Very often, the mobile flange of the drive pulley is slidably mounted on the hub thereof and an abutment system holds it in an axial position with respect to the fixed flange.

It so happens that, in numerous applications, variators of this type are rarely used for speed modifications and the result is that the mobile flange remains in fact in a fixed position which causes contact rust to form in the sliding part which is soon jammed and prevents any further speed variation.

SUMMARY OF THE INVENTION

The purpose of the present invention is to overcome this disadvantage and provides a belt variator in which the mobile flange of the drive pulley is slidably mounted with respect to the hub of the fixed flange without contact so as to avoid, in the case where the device is used for a long time without variation of speed, any risk of contact oxidisation likely to prevent further movement of the mobile flange.

According to the invention, the mobile flange of the drive pulley is supported radially and axially, on its external face side, by a bearing itself supported by a fixed ring during operation of the apparatus. The axial bore of the mobile flange is then made slightly greater than the diameter of the hub of the pulley, thus providing a slight clearance between the mobile flange and this hub. Because of the lack of contact between these two parts, it is impossible for contact rust to form and so any risk of jamming preventing variation of the speed is avoided.

Advantageously, between the support ring and the bearing is disposed an adjusting ring adpated to be screwed inside said support ring and whose inner face is axially solid with the mobile flange through the bearing. Thus, by screwing the adjusting ring inside the support ring, by means of a manual control, speed adjustment is obtained by axial movement of this adjusting ring and so of the mobile flange which is solid therewith.

BRIEF DESCRIPTION OF THE DRAWINGS

In order to well understand the device of the invention, a preferred embodiment thereof will be described hereafter, by way of example and without any limitative character, with reference to the accompanying drawings in which.

DESCRIPTION OF THE PREFERRED EMBODIMENT

Figure 1:
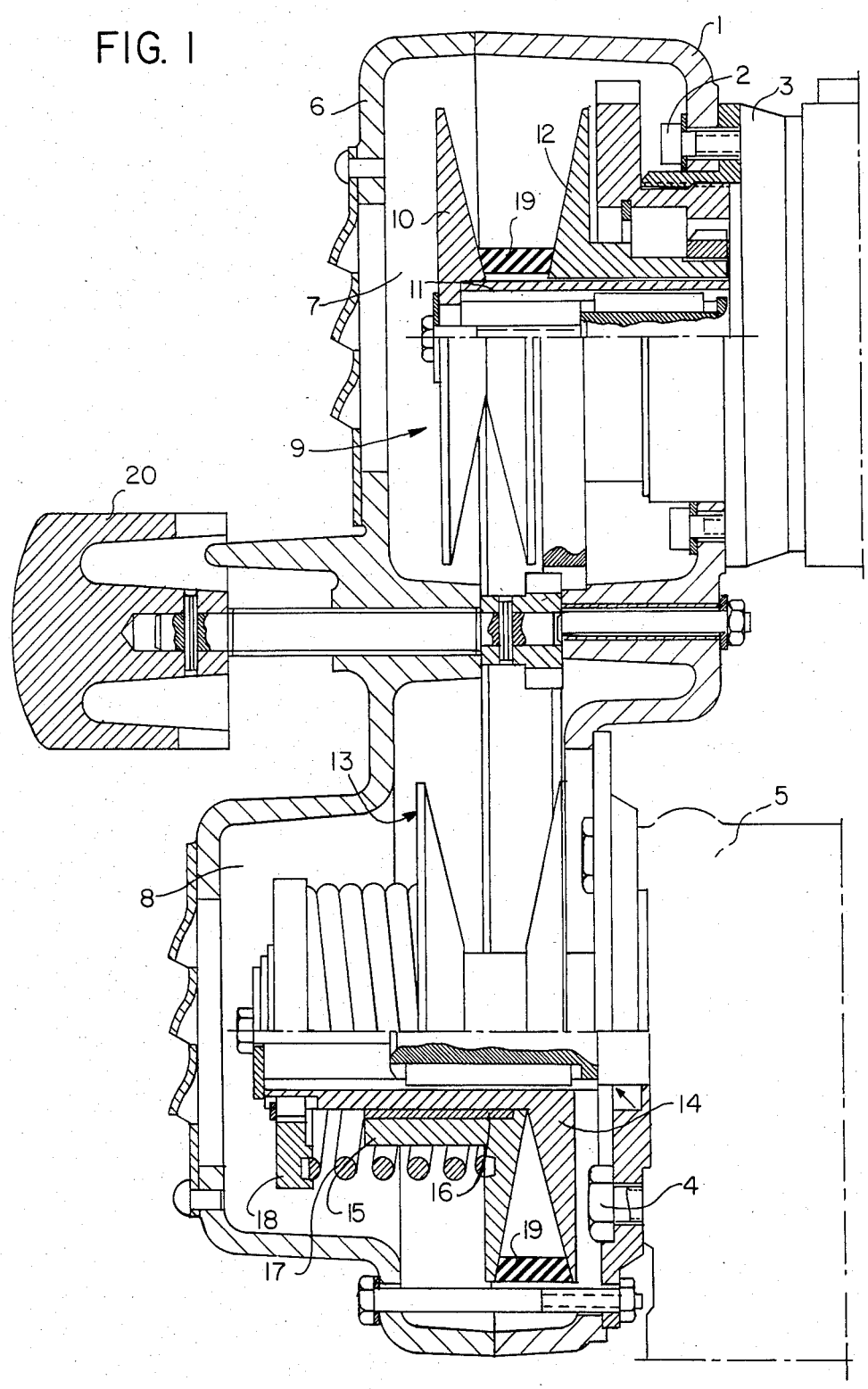
FIG. 1 is a vertical section view of a belt variator according to the invention, intended to be disposed between a motor and a speed reducer, each pulley being shown in each of its two endmost open positions.

Referring to the drawings and more particularly to FIG. 1, there is shown at 1 the casing of the variator whose rear face is intended to be fixed to the upper part, by means of screws 2, at the output of a motor shown schematically at 3 and, at its lower part, by screws 4, to the input of a speed reducer shown at 5. The front face of casing 1 is closed by a cover 6 and defines inwardly an upper chamber 7 and a lower chamber 8.

Inside the upper chamber 7 is disposed the drive pulley 9 which comprises a fixed flange 10 whose hub is solid with one end of a drive ring 11 whose other end is fixed to the output shaft (not shown) of motor 3. The mobile flange 12 of the drive pulley is mounted for movement along ring 11 in a way which will be described hereafter in greater detail with reference to FIG. 2. Inside the lower chamber 8 of casing 1 is housed the driven pulley 13 which, in a similar way, has a fixed flange 14 and a mobile flange 15. The fixed flange 14 is keyed to the input shaft of the speed reducer 5 and the mobile flange 15 is mounted for sliding, by means of a friction ring 16, on the hub of the fixed flange 14. A compression spring 17 is disposed between the mobile flange 15 and a bearing ring 18 fixed on the hub of flange 14, for returning the mobile flange towards this fixed flange. A trapezoidal transmission belt 19 connects together the drive pulley 9 and the driven pulley 13. A manual control handle 20, which will be described in greater detail with reference to FIG. 2, allows the speed to be adjusted.

Figure 2:
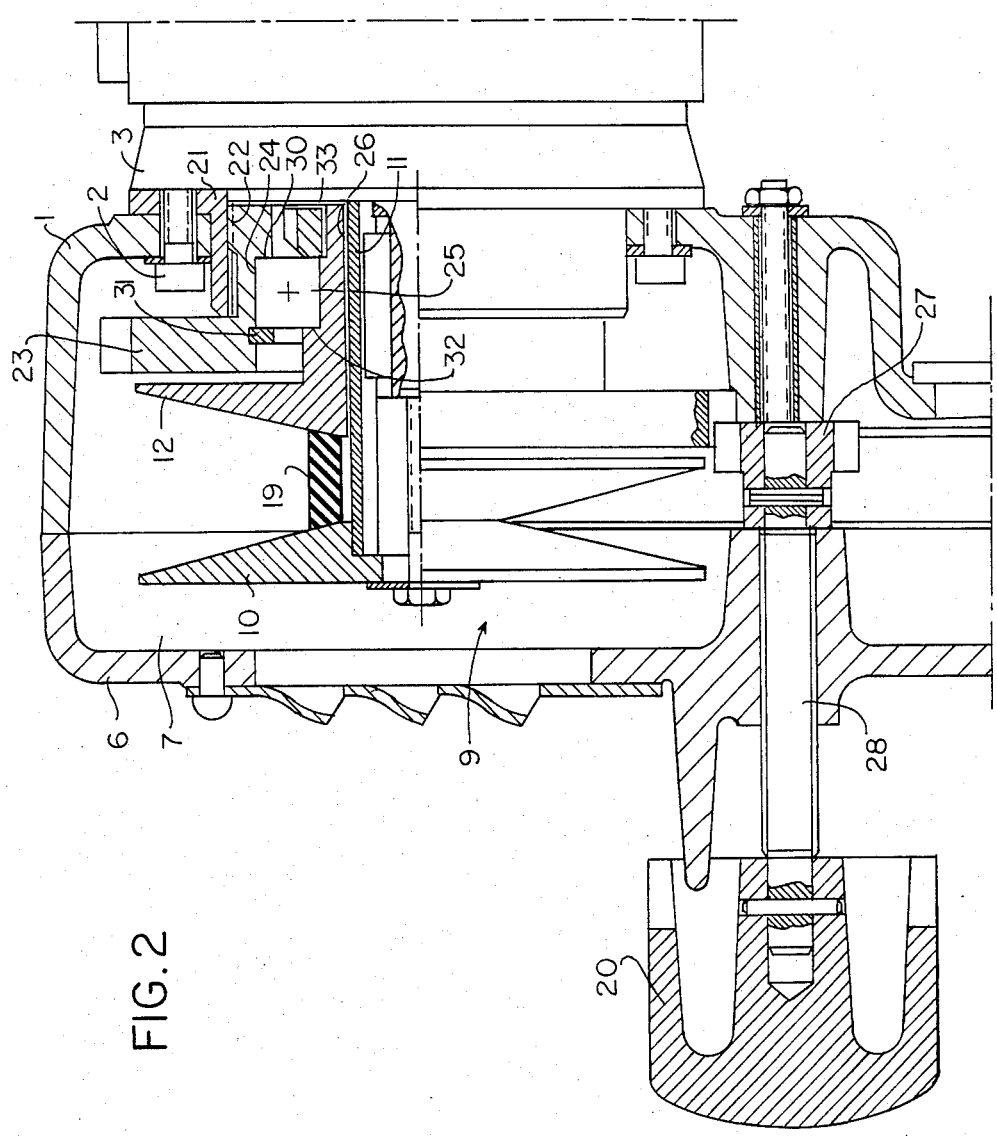
FIG. 2 is a detail view of FIG. 1, on a larger scale, showing the structure of the drive pulley and the manual speed adjustment system.

Referring now to FIG. 2, there is shown at 21 a ring with inner thread for centering the motor 3 in the opening formed at the upper part of the rear face of casing 1. With the threaded face of this centering ring cooperates the outer face 22, which is also threaded, of an adjusting ring 23 and the outer face of the mobile flange 12 of the drive pulley 9 bears radially and axially on a bearing 25 which itself bears on the inner face 24 of the adjusting ring 23. In this arrangement, the axial bore 26 of the mobile flange 12 is slightly greater than the outer diameter of the drive ring 11, for example by about 1 mm, which provides a clearance of about 0.5 mm between ring 11 and the mobile flange 12. Thus, there is no contact between the mobile flange 12 and ring 11 with respect to which this flange moves axially, so that there is no possibility of any formation of contact rust.

On its outer periphery, adjusting ring 23 is adpated for meshing with a pinion 27 fixed to a rod 28 adpated for rotating inside an axial housing in cover 6 and ending outwardly of casing 1 in a manual control handle 20. Bearing 25 is clamped on the one hand between a shoulder 30 of the adjusting ring 23 and a circlip 31 engaged in this ring and, on the other hand, between a shoulder 32 of the mobile flange 12 and a nut 33 screwed on to the hub of this mobile flange.

It can then be seen that, when the user desires to adjust the speed, he operates the adjusting handle 20 so as to rotate it in the appropriate direction which causes, through pinion 27, a corresponding rotation of the adjusting ring 23 causing the axial movement of this ring and consequently, the axial movement of the mobile flange 12.

It will be understood that the above description has only been given by way of example, without any limitative character, and that constructional additions or modifications could be made thereto without departing from the scope of the invention defined by the accompanying claims.

What is claimed is:

1. A belt speed variator which comprises:
   (a) a drive pulley,
   (b) a driven pulley,
   (c) a transmission belt passing over said drive pulley and driven pulley,
   (d) said drive pulley and driven pulley each having an axially fixed flange and a mobile flange moving axially with respect to this fixed flange, the spacing between the flanges of these two pulleys varying in a conjugate way in operation,
   (e) a fixed bearing ring supported by a casing of the variator,
   (f) a bearing which bears on said fixed ring, said bearing supporting radially and axially the outer face of the mobile flange of said drive pulley, and
   (g) a clearance provided between said mobile flange and said axially fixed flange of the drive pulley along the whole length thereof so that no contact point is provided between said mobile flange and said axially fixed flange.

2. Speed variator as claimed in claim 1, further including an adjusting ring inserted between said bearing ring and said bearing, the facing faces of said adjusting ring and said bearing ring being threaded for screwing engagement of said adjusting ring inside said bearing ring, and the adjusting ring being axially solid with the mobile flange so that the axial position of said mobile flange may be modified by rotation of said adjusting ring for adjusting the speed.

3. Speed variator as claimed in claim 2, wherein control of the rotation of said adjusting ring for adjusting the speed is obtained by rotating in a suitable direction a handle secured in rotation with a pinion meshing with said adjusting ring.

* * * * *